United States Patent [19]

Schneider

[11] Patent Number: 5,683,043

[45] Date of Patent: Nov. 4, 1997

[54] PUSHER GRATE COOLER

[75] Inventor: Richard Schneider, Wermelskirchen, Germany

[73] Assignee: Klockner-Humboldt-Deutz AG, Cologne, Germany

[21] Appl. No.: 593,246

[22] Filed: Jan. 29, 1996

[30] Foreign Application Priority Data

Feb. 11, 1995 [DE] Germany ............... 195 04 589.0

[51] Int. Cl.[6] .................................................. B02C 23/08
[52] U.S. Cl. .................................................. 241/65; 241/81
[58] Field of Search .................................... 241/81, 65

[56] References Cited

U.S. PATENT DOCUMENTS

| | | | |
|---|---|---|---|
| 2,609,149 | 9/1952 | Posselt | 241/81 X |
| 2,905,395 | 9/1959 | Petersen | 241/81 X |
| 3,089,653 | 5/1963 | Ostberg | 241/81 |
| 3,106,523 | 10/1963 | Couture | 241/81 X |

FOREIGN PATENT DOCUMENTS

| | | | |
|---|---|---|---|
| 611020 | 3/1935 | Germany | 241/81 |
| 841678 | 4/1952 | Germany | 241/81 |
| 23 25 311 B2 | 12/1973 | Germany . | |
| 695707 | 11/1979 | U.S.S.R. | 241/81 |

*Primary Examiner*—Mark Rosenbaum
*Attorney, Agent, or Firm*—Hardaway Law Firm P.A.; Charles L. Schwab

[57] ABSTRACT

An oscillating screen (13) is positioned between a grate system (11) of a grate cooler and a crusher (16) to separate the fines from the material discharged by the grate cooler prior to feeding the remaining clinkers to the crusher (16). This arrangement of equipment greatly increases production and markedly reduces wear of crusher components.

8 Claims, 2 Drawing Sheets

PUSHER GRATE COOLER

TECHNICAL FIELD

This invention relates to a pusher grate cooler for cooling hot material such as cement clinker discharged from a rotary kiln, of the type having a cooling grate which includes stationary grate plates and oscillating grate plates moving back and forth in the grate conveyance direction and through which cool air flows. A crusher is positioned near the material discharge end of the cooling grate for reducing the size of the cooled material.

BACKGROUND OF THE INVENTION

The grate system of a pusher grate cooler consists of a number of stationary and moving grate plate supports, to which grate plates are fastened. The grate plates are provided with air openings through which cool air flows substantially upwardly. As viewed in the conveyance direction, the stationary ranks of grate plates alternate with ranks of grate plates movable back and forth, which are jointly fastened, via their correspondingly back and forth movable grate plate supports, to one or a plurality of longitudinally movably supported driven pusher frames. The oscillating movement of the movable ranks of grate plates causes the material to be cooled, such as hot cement clinker discharged from a rotary kiln, and gradually transported to the material discharge end of the grate system.

German patent document DE-B 23 25 311 shows a pusher grate cooler for cooling hot cement clinker discharged from a rotary kiln which has a stationary and obliquely downwardly sloping screen in the form of a slotted grate at the material discharge end of the pusher grate cooler. The slotted grate serves to convey the large cement clinker lumps, roughly larger than 25 mm in diameter, to a crusher, such as an impact mill, which subjects the clinker lumps to size reduction. The material thus reduced in size, and the material passing through the screen are conveyed by a conveyor to a second material cooler. At the high cement clinker production rates achieved in practice and correspondingly high pusher grate cooler throughput capacities, an undesirable high content of fine and extra-fine clinker is delivered to the crusher at the material discharge end of the grate system, which fine and extra-fine clinker cannot be screened out with the upstream slotted grate and contributes substantially to the wear of the crusher. There is also danger of material piling up in front of the crusher at the material discharge end of the grate cooler if a double-roll crusher, rather than an impact mill, is used in the system.

OBJECTS AND SUMMARY OF THE INVENTION

It is an object of the invention to provide a pusher grate cooler having reliable high production capacity, in which the crusher at the material discharge end of the grate system is effectively relieved of the load of fine and extra-fine material.

It is a further object of this invention to provide a high production pusher grate cooler in which material does not pile up in front of the crusher at the material discharged and of the grate system.

In the pusher grate cooler of the invention, an oscillating screen is inserted between the material discharge end of the grate system and the crusher. The oscillating screen, set in oscillation by its own oscillatory drive, with a variable oscillation amplitude and/or oscillation frequency, is able to separate very effectively and rapidly the fine and extra-fine fractions of material from the material discharged from the grate system of the cooler, thus relieving the crusher of the load of these fractions, whether it is a double-roll crusher, a hammer crusher or other suitable crusher. The use of an oscillating screen immediately upstream of the crusher, eliminates the heretofore experienced problem of material piling up in front of the crusher. The grate cooler with the oscillating screen and integrated crusher, operate reliably with high production capacity. Shutdowns of the entire grate cooler operation caused by crusher operating problems are reduced to a minimum.

The oscillating screen placed immediately upstream of the crusher in the grate cooler of this invention not only replaces the downward sloping slotted grate, shown in German patent document DE-B 23 25 311, but also replaces a heretofore used roller conveyer placed immediately upstream of the crusher. The roller conveyor, with rollers alongside one another and rotating in the same direction, cannot effectively separate the fine and extra-fine fractions from the material being transported. In fact, such roller conveyors are primarily responsible for the piling up of material in front of the crusher.

BRIEF DESCRIPTION OF THE DRAWINGS

Two embodiments of the invention are illustrated in the drawings in which.

DETAILED DESCRIPTION OF THE DRAWINGS

Figure 1:
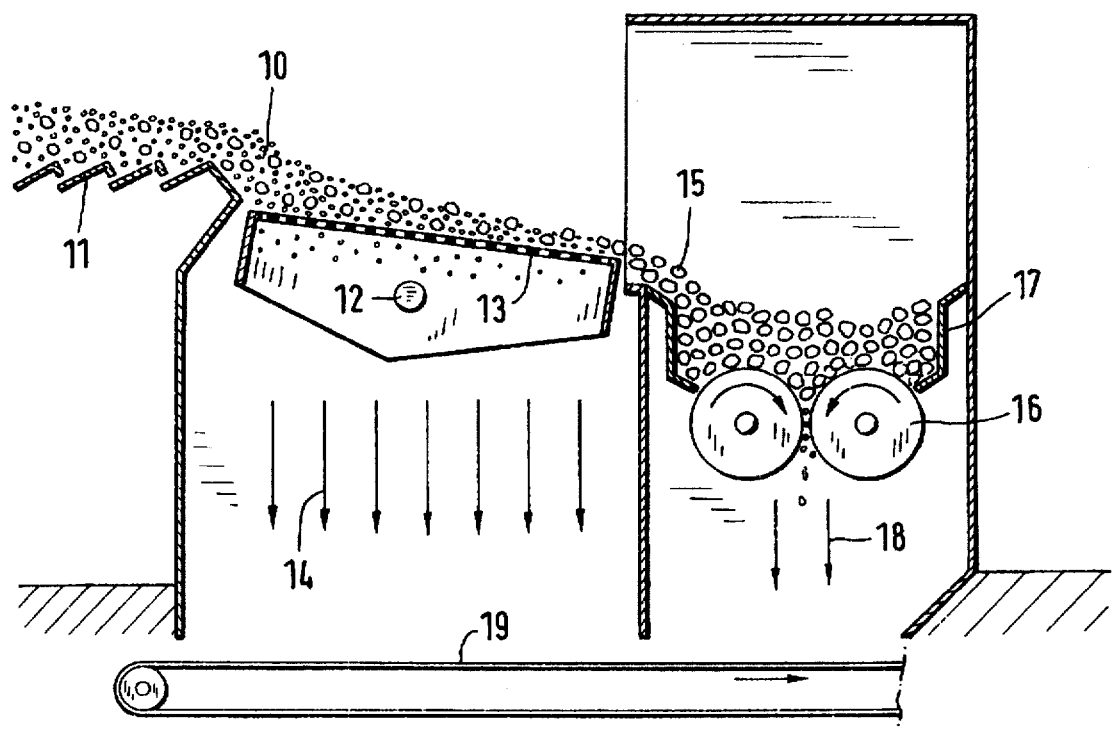
FIG. 1 is a schematic side view of a first embodiment of the invention showing the discharge region of a pusher grate cooler for the cooling of incandescently hot cement clinker discharged from a rotary kiln and employing a roll crusher.
Figure 2:
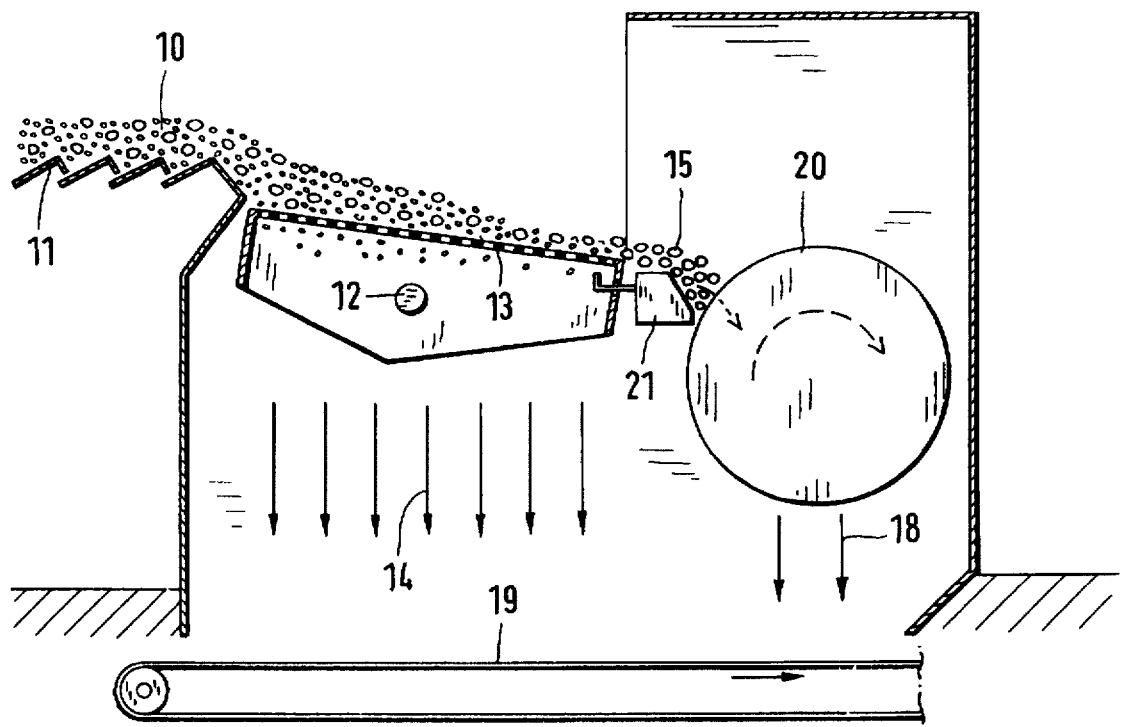
FIG. 2 shows a second embodiment of the invention in which an impact crusher is positioned at the discharge region of a pusher grate cooler.

The pusher grate coolers of FIG. 1 and 2 include a cooler grate (11) having stationary grate plates and alternating movable grate plates which oscillate back and forth, the latter being fastened to back and forth movable pusher frames by corresponding grate plate supports. The hot material (10) on the cooling grate (11) is gradually transported from left to right, as viewed in the drawings, by means of the common oscillating motion of all of the moveable pusher frames effected by an oscillatory drive. The hot material is cooled by cool air flowing substantially from bottom to top through the perforations in the individual grate plates and through the hot clinker bed (10). Adjacent to the material discharge end of the grate system (11) is an oscillating screen (13) equipped with its own oscillatory drive (12), which operates to separate the fine and extra-fine fraction (14) from the hot material (10) with a highly efficient separation, so that in fact only the large clinker lumps (15), for example those larger than 30 mm in diameter, remain lying of the deck of the oscillating screen (13). The crusher located immediately downstream of the oscillating screen (13), in FIG. 1 a double-roll crusher (16) having a feed hopper (17), is loaded only with this oversize fraction (15) and is relieved of the load of the fine and extra-fine material fraction (14). Pileups of material in front of the crusher (16) are avoided. Oscillating screens of proven mechanical designs can readily be sized for material capacities sufficient to handle the output of a pusher grate cooler. In other words, by placing an oscillating screen immediately upstream of the crusher (16), and at the cooler discharge, the desired high throughout capacity of the pusher grate cooler is achieved.

The undersize material (14) discharged by the oscillating screen (13) and the material (18) reduced in size by the crusher (16) are together conveyed away by a conveyor in the form of an endless belt conveyor (19), to a storage area, such as a clinker bunker.

In the embodiment of the invention shown in FIG. 1, the oscillating screen (13) is placed immediately upstream of a double-roll crusher (16). In the embodiment of the invention shown in FIG. 2, the oscillating screen (13) is placed immediately upstream of a hammer crusher (20). Here too, the hammer crusher (20) is loaded only with the oversize fraction (15), that is, with the coarse cement clinker lumps of the hot material (10), as a consequence of the immediately upstream position of the oscillating screen (13). A deflector beam (21) is position between the hammer crusher (20) and the oscillating screen (13) to protect the oscillating screen and to guide and deliver the coarse cement clinker lumps (15) to the hammer crusher (20).

In both embodiments of the invention the crusher units located immediately downstream of the oscillating screen (13) are markedly relieved of the load of fine and extra-fine material, thereby greatly reducing the wear on the crusher rolls (16) in the FIG. 1 embodiment or on the hammers of the hammer crusher (20) in the FIG. 2 embodiment.

The oscillating screen (13) can be built into the lower part of the material discharge end of the grate cooler.

The invention is applicable not only to grate coolers having a crusher arranged on the material discharge end, but also for a grate cooler having an intermediate crusher positioned in the route of the cooling material from the upstream end of the cooler to the cooled material discharge end.

What is claimed is:

1. Apparatus for cooling and crushing hot cement clinker discharged from a rotary kiln comprising:

a pusher cooler receiving and cooling hot cement clinker discharged from said rotary kiln, including a cooling grate (11) having stationary grate plates and movable grate plates oscillating back and forth in the direction said cement clinker is moved by said cooling grate to a discharge end of said cooling grate (11) as cool air flows through said grate plates, a crusher containing at least one rotor positioned downstream of said cooling grate (11) for the size reduction of the cooled cement clinker, an oscillating screen (13) immediately downstream of said discharge end of said cooling grate (11) and upstream of said crusher, said oscillating screen including an oscillatory drive (12) operable to oscillate said oscillating screen independently of said cooling grate, said oscillating screen being operable to prevent accumulation of cement clinker immediately upstream of said crusher, said rotor having an outer periphery which moves upwardly adjacent to said oscillating screen and a deflector beam (21) positioned between said oscillating screen (13) and said rotor in protecting relationship to said oscillating screen (13).

2. The apparatus of claim 1 wherein said crusher is a double-roll crusher (16).

3. The apparatus of claim 1 wherein said crusher is a hammer crusher (20) and wherein the radially outer periphery of said hammer crusher (20) moves upwardly adjacent said oscillating screen.

4. The apparatus of claim 1 wherein said oscillating screen (13) is built into said discharge end of said grate cooler.

5. The apparatus of claim 1 wherein said oscillatory drive is variable in oscillation amplitude.

6. The apparatus of claim 1 wherein said oscillatory drive is variable in oscillating frequency.

7. The apparatus of claim 6 wherein said oscillatory drive is variable in oscillation amplitude.

8. The apparatus of claim 1 and further comprising an endless belt beneath said oscillating screen and said crusher receiving and conveying material passing through said oscillating screen and crusher.

\* \* \* \* \*